Nov. 24, 1953
A. BLONDEL
2,660,190
AUTOMATIC BLENDING DEVICE FOR LIQUIDS
Filed Dec. 1, 1949
3 Sheets-Sheet 1
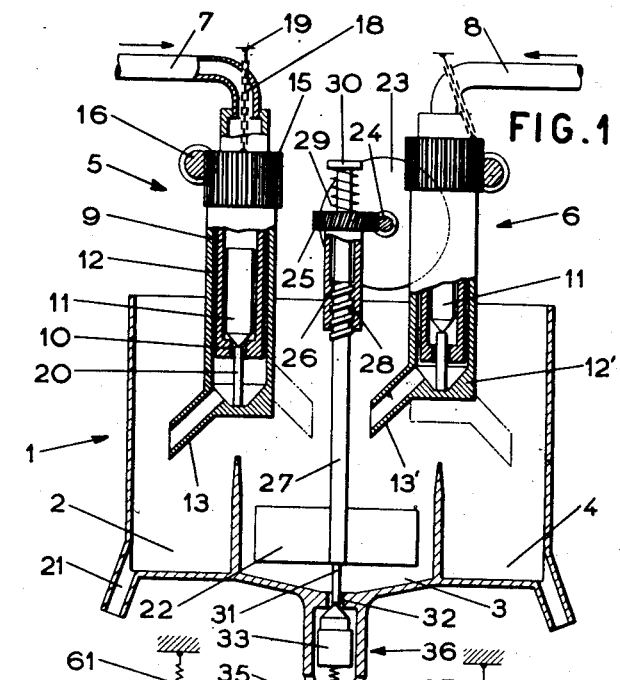
FIG.1
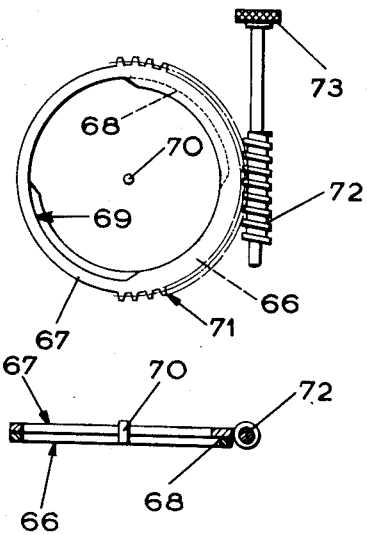
FIG.3
FIG.4
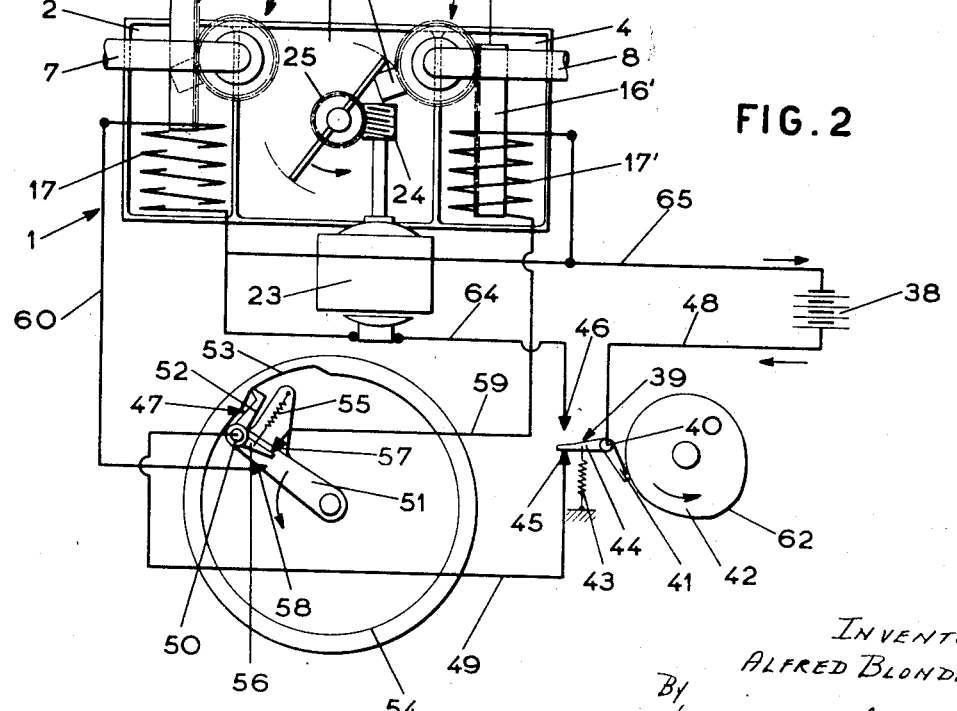
FIG.2
INVENTOR:
ALFRED BLONDEL
By
Haseltine, Lake & Co.
AGENTS Patented Nov. 24, 1953

2,660,190

UNITED STATES PATENT OFFICE 2,660,190

AUTOMATIC BLENDING DEVICE FOR LIQUIDS

Alfred Blondel, Paris, France

Application December 1, 1949, Serial No. 130,551

Claims priority, application France December 7, 1948

11 Claims. (Cl. 137—313)

My present invention relates to a blending device whereby a plurality of liquids may be mixed in accurately predetermined relative amounts.

One object of my invention is to provide an automatic blending device for mixing a plurality of liquids in predetermined relative amounts.

Another object is to provide an automatic blending device for liquids wherein the relative proportions of the liquids to be mixed are controlled with accuracy.

A further object of my invention is to provide an automatic blending device for liquids in which the relative proportions of the liquids to be mixed together may be varied progressively, either through a manual control, or through an arrangement responsive to a change in a given condition such as pressure, density, temperature or the like.

Yet another object of my invention is to provide a continuously operating blending device of the type set forth.

Other objects, features and advantages of my invention will be apparent to those skilled in the art from the following description of two specific embodiments thereof.

According to my invention the liquids to be mixed together are passed through ports having a same size during times corresponding to the relative proportions or ratios to be obtained in the final blend.

A blending device according to my invention comprises in combination: means for supplying liquids to be mixed to related valves; means for directing the liquids from the said valves into a blending receptacle; means for opening said valves when in operative position during a time corresponding to the desired ratio of the corresponding liquid in the final mixture; means for agitating the blend prior to delivery thereof; means for discharging the blend into a receiving receptacle; electrically-operated control means for actuating said valves in accordance with a predetermined sequence of operation; and cam means for operating said control means.

I will describe now my invention in connection with two specific embodiments thereof, in the case of the blending of two liquids, with manual control of the relative liquid ratios in the blend; but it is to be clearly understood that this description is only illustrative and is intended in no manner to restrict the general scope of my invention. The embodiments are illustrated in the annexed sheets of drawings, wherein:

Fig. 1 is an elevational view, partly in section, of a blending device according to my invention;

Fig. 2 is a diagrammatical plan view of the blending device of Fig. 1, showing the associated control commutator and electrical circuits;

Fig. 3 is a detailed view of the control cam of the commutator;

Fig. 4 shows the control cam of Fig. 3 in vertical section;

Figure 5:
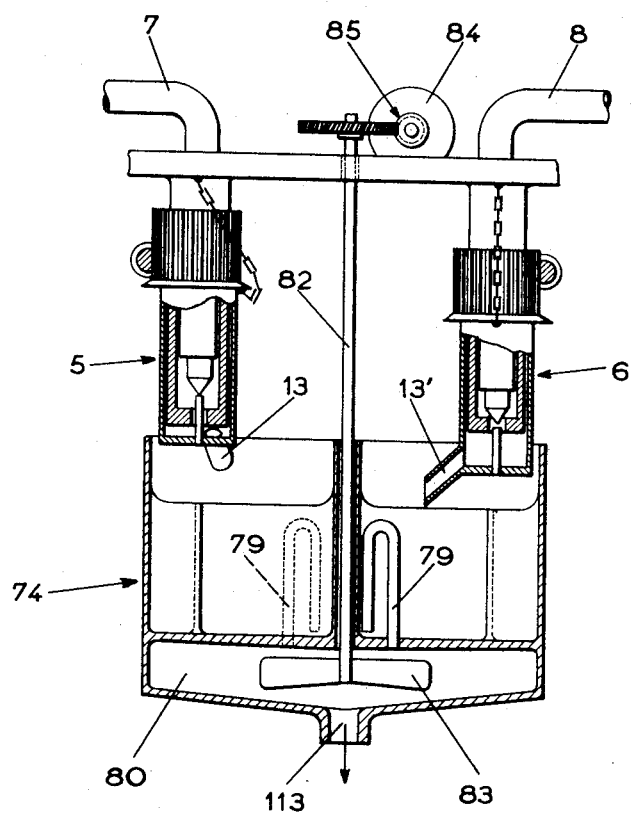
Fig. 5 is an elevational view, partly in section, of a variation of a blending device in accordance with my invention.

Referring first to Figs. 1 and 2 a tank 1 is divided into three compartments 2, 3, 4. The compartment 3 is centrally located in the tank and the compartments 2 and 4 are oppositely arranged on either side of the compartment 3. Two rotating valves 5 and 6 are adapted to be rotated about substantially vertical axes above the tank 1 and are each fed from a convenient source of liquid (not shown) through pipes 7 and 8 respectively. The liquids flow through a central, fixed bushing such as 9 provided with a calibrated aperture 10 near the bottom end thereof, said aperture 10 being closed normally by a needle-valve 11. The fixed bushing 9 acts as a guide for a casing 12 adapted to be rotated thereabout and provided with a spout 13 for delivering the liquid either in the central compartment 3 or in the adjacent side compartment such as 2.

The casing 12 is driven in rotation by a rack 14 meshing with a toothed wheel 15 attached to the casing or integral therewith. The rack 14 is cut in the shank of a plunger 16 for an electromagnet 17 the energization of which will be described later.

The rotating movement of the casing 12 causes its lifting up due to a flexible connection 18 attached to the casing at the lower end thereof and to a fixed point of the assembly, such as 19, at the upper end thereof. As the casing 12 is rotated, the flexible connection 18 causes said casing to be lifted up. A control needle 20 attached to the casing 12 and projecting upwardly within the calibrated aperture 10 engages the bottom surface of the needle-valve 11 in the bushing 9. Thus the lifting movement of the casing 12 causes the control needle 20 to be lifted up, forcing the needle-valve 11 upwardly and allowing the liquid from the pipe 7 to flow through the calibrated aperture 10. The arrangement of the parts is such that the lifting movement of the needle-valve 11 only occurs when the related spout is angularly positioned above the central compartment 3 of the blending device, thus supplying said compartment with a given amount of liquid controlled by the length of time during which the aperture 10 is opened. After a predetermined period of time, the electro-magnet 17 becomes de-energized in a manner which will be explained later and the casing 12 returns down allowing the needle-valve 11 to come back against its seat, and simultaneously the spout is rotated to be positioned above the adjacent compartment 2 wherein any drop or liquid escape is recovered to be fed to the liquid source through a pipe 21.

The other rotating valve 6 is similarly arranged with an electro-magnet 17' to supply the central compartment 3 with the desired amount of the related liquid.

A rotating agitator 22 within the mixing compartment 3 is driven by an electrical motor 23 by means of a worm gear 24 meshing with an helical toothed wheel 25 attached to a bushing 26; the shaft 27 of the agitator projects through the bushing 26 and is provided with a threading 28 engaged within the complementarily machined bushing 26. On the other hand, a spring 29 is anchored to the bushing 26 at one end and bears against the under surface of a flange 30 in the upwardly projecting portion of the agitator shaft 27.

After both rotating valves 5, 6 have supplied successively the related liquids in the central mixing compartments 3 to provide the desired blend, the motor 23 is energized by an arrangement to be described later and rotates the shaft 27 with its agitator 22. Due to the inertia of said agitator, helped by the frictional resistance from the blend in the mixing compartment 3, the agitator shaft 27 tends to conserve its angular position while the threaded bushing 26 is rotated by the motor 23, thus tightening the spring 29 until the agitator shaft 27 is driven in rotation. By reason of the unscrewing movement of the agitator shaft 27, said shaft is forced down and its shank 31, passing through an opening 32 in the bottom wall of the mixing compartment 3, presses down a discharge valve 33 against the action of a spring 34 resting on the bottom face 35 of a chamber 36 depending from the tank 1. The discharge valve 33 thus allows the blend in the mixing compartment 3 to flow down in the chamber 36 and then through openings 37 in the walls of said chamber, to be recovered in a receiving receptacle (not shown) placed under the blending device.

After the motor 23 has stopped, thus stopping the bushing 26, the coil spring 29 acts on the agitator shaft 27 to rotate it in the reverse direction, thus screwing said shaft into the bushing 26 and moving it upwardly, whereby the discharge valve 33 is applied against its seat under the action of the spring 34. The same cycle of operation may be effected again.

I will describe now in fuller detail the manner in which the electro-magnets 17, 17' and the electrical motor 23 are controlled by an automatic control mechanism to accomplish the above-described operations:

Electrical current from a suitable source 38 is supplied to a bell-crank lever 39 pivoted at 40 and an arm 41 of which is urged against the periphery of a control cam 42 by a spring 43. The control cam 42 is rotated continuously at constant speed by any convenient means (not shown) and makes a complete revolution during a cycle of operation. The arm 43 of the bell-crank lever 39 may engage a contact 45 or a contact 46 under the control of the cam 42. Whenever the arm 44 engages the contact 45, current from the source 38 is supplied to a second bell-crank lever 47 through lead 48, arm 44 and wire 49. The bell-crank lever 47 is pivoted at 50 on a rotating arm 51 driven by any convenient means. The lever 47 has an arm 52 sliding along the internal contour of a fixed cam profile 53, 54, against which it is applied by a spring 55. The other arm 56 of the bell-crank lever 47 is adapted to engage two contacts 57, 58 attached to the rotating arm 51, but electrically insulated therefrom. Whenever the arm 52 of the bell-crank lever 47 passes in front of the recessed cam portion 53, the lever arm 56 engages the contact 57 and current flows to the electro-magnet 17' through the wire 59. The magnet plunger 16' is attracted and causes the valve casing 12' to be rotated until the spout 13' thereof is positioned above the mixing compartment 3.

Similarly, whenever the arm 52 of the bell-crank lever 47 slides along the cam portion 54, the lever arm 56 engages the contact 58 and current flows through the wire 60, thus energizing the electro-magnet 17 to operate the rotating valve 5. Simultaneously a spring 61' acting on the magnet core 16' moves this core back to restore the spout 13' to its rest position above the recovery compartment 4.

Periodically the boss 62 in the control cam pushes the arm 41 of the bell-crank lever 39 to bring its other arm 44 into engagement with the contact 46. The magnets 17, 17' are no more energized and are moved to their rest position by the springs 61, 61' respectively. The current from the source 38 then flows through the wire 64, the motor 23 and back through the wire 65, to energize the motor 23 which operates the agitator 22 and opens the discharge valve 33 as has been explained previously. The angular length of the boss 62 in the control cam 42 is designed to permit a complete flowing away of the blend in the mixing compartment 3. Of course, the speeds of rotation of the control cam 42 and of the rotating commutator arm 51 are adjusted in order that the discharge only occurs after the mixing compartment 3 has been supplied with a suitable amount of the blend.

The angular length of the recessed portion 53 in the commutator cam 53, 54 may be varied, and simultaneously the angular length of the solid portion 54 of said cam is varied in the reverse direction by the arrangement shown in Figs. 3 and 4. As may be seen from these figures, the commutator cam 53, 54 is made up of a pair of superimposed rings 66, 67 having a same profile, with a recessed portion 68, 69 extending along half the circumference thereof. The lower cam ring 66 is fixed and the upper cam ring 67 is adapted to be rotated about their common center 70 by means of an external toothed portion 71 cut in the cam ring 67 and meshing with a worm gear 72 controlled either by a control knob 73, as illustrated, or by a suitable condition-responsive device (not shown). By rotating the upper cam ring 67 about its axis 70, the angular length of the recessed portion 53 may be varied in the range 0° to 180°, thereby varying the time during which the electro-magnets 17, 17' are energized in a complete revolution of the commutator arm 51 and of the control cam 42. It may be seen that, when both recessed portions in the cam rings 66, 67 are superimposed, the electro-magnets 17, 17' are energized successively during a time corresponding to half a revolution of the commutator arm 51, resulting in an equal amount of liquid flowing from the rotating valves 5, 6 that is the ratio of the blending is 50/50. When the upper cam ring 67 is rotated progressively through half a revolution, the angular length of the cam recess 53 tends to become nil and the ratio of blending of the liquids progressively tends to 0/100. In this manner, any predetermined ratio of blending may be obtained. Obviously the control knob 73 may be provided with a pointer co-operating with a graduated dial allowing an easy setting of the commutator cams.

In the blending device just described, after the liquids have been blended in the mixing compartment 3, the blend is passed to the receiving receptacle. This device therefore does not allow a continuous operation, although in some applications such a continuous operation would be useful.

Figure 6:
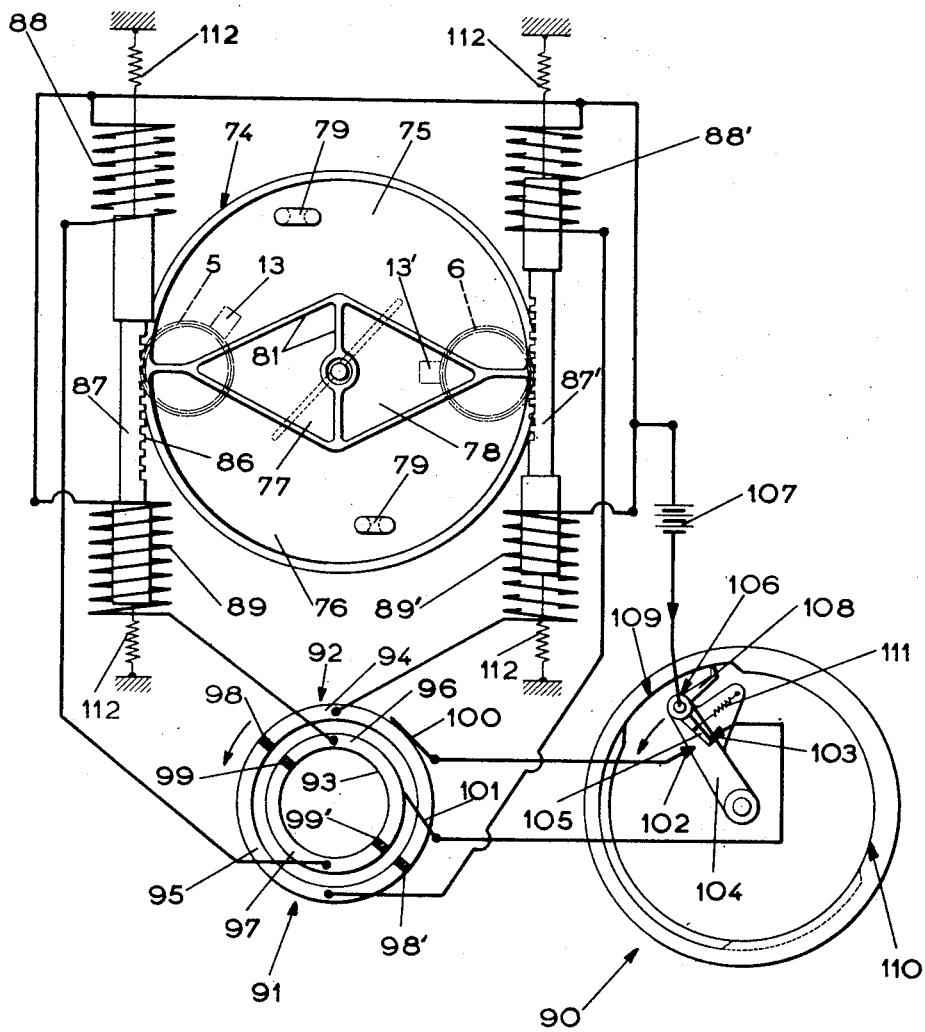
Fig. 6 diagrammatically shows the blending device of Fig. 5 in plan with the co-operating modified controlling commutator thereof associated with a rotating distributor.

Figs. 5 and 6 diagrammatically show a variation of my invention enabling a continuous blending to be effected, even during discharge of the complete blend.

In this device, a tank 74 comprises four compartments 75, 76 and 77, 78. The compartments 77, 78 are arranged centrally in the tank 74. A pair of rotating valves 5, 6, identical to the valves 5, 6 of the previous example are arranged above these compartments with spouts 13, 13' adapted to be displaced above compartments 75, 76 and 77 or 78 as the case may be.

Both compartments 75 and 76, the mixing compartments, are provided with upwardly projecting syphons 79 opening in a common chamber 80 at their lower end. The upper part of the syphons 79 is located at a level below the level of the upper edge of the separating wall 81 dividing the tank 74 into its four compartments. A channel is provided through the wall 81 and is coaxially arranged in the tank 74, and the shaft 82 of an agitator 83 located in the common chamber 80 extends upwardly through this channel. The agitator 83 is rotated by an electrical motor 84 through a gearing arrangement 85.

In this example, both rotating valves 5, 6 successively supply the compartment 75 and the compartment 76 with their related liquids, and in their rest position they are resting above their related recovery compartment 77, 78 wherefrom any spurious escape or dropping of liquid is returned to the appropriate source of liquid through suitable connections (not shown).

The valves 5 and 6 are controlled by means of racks 86 in the shank of a common plunger member 87 for a pair of electro-magnets 88, 89 for the valve 5 and 88', 89' for the valve 6. A control commutator 90 similar to the commutator of the previous example is used in connection with a rotating distributor 91 comprising two rotating rings 92, 93 each comprised of two conductive ring halves 94, 95 and 96, 97, respectively, electrically insulated with respect to each other at 98, 98' and 99, 99' respectively. The half-ring 94 is connected to the electro-magnet 89' and the half-ring 95 to the electro-magnet 88'; similarly, the half-ring 96 is connected to the electro-magnet 89 and the half-ring 97 to the electro-magnet 88. It is thus seen that each distributor ring 92, 93 is associated with the pair of electro-magnets which control a given rotating valve 5 or 6. The commutator 90 is rotated preferably at a speed which is an even multiple of that of the distributor 91.

Both distributor rings are fed through wipers 100, 101 respectively, connected to contacts 102, 103 arranged on the rotating control arm 104 of the commutator 92, these contacts being adapted to co-operate with the arm 105 of an oscillating bell-crank lever 106 supplied with electrical current from a suitable source 107 and whose free arm 108 is kept into engagement with the internal cam profile 109, 110 under the tension of a spring 111.

The operation of the blending device of Figs. 5, 6 is as follows:

In the position illustrated in Fig. 6, current is applied to the electro-magnet 89 through the bell-crank lever arm 105, contact 103, wiper 101 and distributor ring 96. The electro-magnet 89 is energized and attracts in the plunger 87, thus rotating the valve 6 counterclockwise to distribute liquid into the mixing compartment 75. Later on, when the arm 108 of the bell-crank lever 106 passes to the solid cam portion 110 of the commutator 90, then the arm 105 of the bell-crank lever 106 is brought into engagement with the contact 102, thus feeding the electro-magnet 89' through the wiper 100 and the distributor half-ring 94, to cause liquid from the pipe 8 to be distributed into the mixing compartment 75.

As soon as any magnet becomes de-energized, a spring 112 moves back the plunger member 87 or 87', as the case may be, to its mid-position in which the related spout 13 or 13' lies above the related recovering compartment 77 or 78.

After the cam commutator 90 has rotated through a given number of complete revolutions, thereby supplying the mixing compartment 75 with successive predetermined amounts of each liquid to be mixed into a blend, the arm 108 of the bell-crank lever 106 passes from the solid cam portion 110 to the recessed cam portion 109, or reversely, at an instant where the insulated portions 98' and 99' or 98 and 99 of the distributor rings 91 and 92 pass the associated wipers 100 and 101. Assuming for instance that the arm 108 passes from the recessed cam portion 109 to the solid cam portion 110 at the instant under consideration and that, at the same instant, the insulated portions 98' and 99' pass the wipers, then the electro-magnet 89' becomes de-energized and current is supplied to the electro-magnet 88' for supplying liquid into the second mixing compartment 76 in the tank 74. Later on, the bell-crank lever arm 108 passes to the recessed cam portion 109 in the commutator 90 and the electro-magnet 88 becomes energized, whereby the rotating valve 5 is rotated clockwise to supply liquid from the pipe 7 into the mixing tank compartment 76. It is thus seen that both mixing compartments 75 and 76 are supplied alternately an equal number of successive times with the liquids to be blended, and the liquid blend may be extracted from one compartment while the other is being filled, the extraction occurring through the related syphon 79 when the corresponding mixing compartment has been filled to the required level.

It is to be noted that the shorter arm of the syphons 79 preferably extends down to near the bottom wall of the mixing compartments 75, 76, thus drawing off an homogeneous blend, which is further mixed by the agitator 83 in the intermediate delivery chamber 80.

Depending upon the relative angular speeds of the commutator 90 and of the rotating distributor 91 the number of successive deliveries of liquids to a given compartment prior to its extraction may be changed; in any case, however, the liquids are blended in each mixing compartment 75 and then 76 until the blend level reaches the top of the syphons 79, whereupon the blend is discharged into the common intermediate chamber 80 to be recovered in a suitable receptacle (not shown) through the opening 113 in the bottom of said common chamber.

While I have described my invention in connection with two specific embodiments thereof, it is to be clearly understood that these embodiments have been given in an illustrative sense only, and that I do not intend to limit my invention more than comprised within the scope of the appended claims.

What I claim is:

1. Automatic device for mixing liquids in variable amounts, comprising in combination a plurality of discharge valves set in discharge position by rotation through a given angle; means supplying them respectively with the liquids to be blended; a mixing tank located under said valves when in discharge position, the outlet members of said valves are moved into a position over the said tank to discharge thereinto when the valves are opened, and are moved out of such discharge position over the mixing tank as the valves are closed, said outlet members being then moved into a position over two receptacles connected to the source of liquid, wherein any drop of liquid that still might flow out from the closed valves will be recovered and fed back to the source of liquid, the said two receptacles being oppositely arranged adjacent to the said mixing tank; electromagnetic means for rotating said valves, a control mechanism, connections connecting the electromagnetic means with the control mechanism, a source of electrical energy, connections connecting the source with the control mechanism and the electromagnetic means, means enabling the control mechanism to energize the said electromagnetic means for each one of its operative cycles.

2. Automatic device for mixing liquids in variable amounts, comprising in combination: several discharge valves, each having a lower outlet spout and an upper inlet opening, respectively connected with a movable barrel and a fixed bushing located within it, means tightly connected to the valve inlet openings and supplying them with the liquids to be blended, electromagnetic means for rotating said barrels, other means for lifting them from their lower positions when rotated, calibrated apertures at the bottom of the bushings, means to seal these apertures when the barrels are in their lower positions and to unseal them when the barrels are rotated through a given angle from these positions; a mixing tank located under the valve spouts when these valves are in open condition, said spouts being moved into a position over the tank to discharge thereinto when the valves are opened, the spouts being moved out of such discharge position over the mixing tank as the valves are closed, said spouts being then moved into a position over two receptacles connected to the source of liquid, wherein any drop of liquid that still might flow out from the closed valves will be recovered and fed back to the source of liquid, the said two receptacles being oppositely arranged adjacent to the said mixing tank; an automatic control mechanism, connections connecting the electromagnetic means with the control mechanism, a source of electrical energy, connections connecting the source with the control mechanism and the electromagnetic means, means enabling the control mechanism to energize the said electromagnetic means for each one of its operative cycles, other means enabling the control mechanism to vary at any time the energizing durations of said enabling means so that one of them can be varied from zero to one half the cycle period whereas the other one is varying from one half to full cycle period, said connection between said electromagnetic means and the control mechanism being changeable to invert the cycle period.

3. A device as claimed in claim 2, wherein the number of discharge valves is equal to two.

4. Automatic device for mixing an even number of liquids in variable amounts, comprising in combination the same number of discharge valves set in discharge position by rotation through a given angle, means supplying them respectively with the liquids to be blended, a mixing tank located under said valves when in discharge position, the outlet members of said valves being moved into a position over the tank to discharge thereinto when the valves are opened and the said outlet members being moved out of such discharge position over the mixing tank as the valves are closed, said outlet members being then moved into a position over two receptacles connected to the source of liquid, wherein any drop of liquid that still might flow out from the closed valves will be recovered and fed back to the source of liquid, the said two receptacles being oppositely arranged adjacent to the said mixing tank; a separate pair of electromagnetic means for rotating each valve separately, a control mechanism including a separate pair of switching devices for each valve, connections respectively connecting the pairs of electromagnetic means with the switching devices, a source of electrical energy; connections connecting the source with the timer and the electromagnetic means, means enabling each switching device to energize successively the two electromagnetic means controlling each pair of valves for each operative cycle of the timer.

5. Device as claimed in claim 1, wherein the number of discharge valves is equal to two and electromagnetic means is equal to four.

6. Automatic device for mixing liquids in variable amounts, comprising in combination an even number of discharge valves set in discharge position by rotation through a given angle, means supplying them respectively with the liquids to be blended, a mixing tank located under said valves when in discharge position, the outlet members of said valves being moved into a position over the tank to discharge thereinto when the valves are opened and said outlet members being moved out of such discharge position over the mixing tank as the valves are closed, said outlet members being then moved into a position over two receptacles connected to the source of liquid, wherein any drop of liquid that still might flow out from the closed valves will be recovered and fed back to the source of liquid, the said two receptacles being oppositely arranged adjacent to the said mixing tank; distinct electromagnetic means for rotating said valves, a control mechanism, comprising for each pair of valves a fixed ring and a member therein, rotatable at a uniform rate, switching contact pieces mounted on that member, one of said contact pieces being arranged to cooperate with a lateral wall of the ring, said ring being provided with a recess, means for adjusting at any time the angular width of that recess from zero to 180 degrees, connections connecting the electromagnetic means controlling each pair of valves to two contact pieces of the corresponding member, a source of electrical energy, connections connecting said source to all rotatable members and to the electromagnetic means, enabling the control mechanism to energize alternately the two electromagnetic means associated with each rotatable member during each complete revolution of that member.

7. Automatic device as claimed in claim 6, wherein the lateral wall of each ring and its recess are circular and coaxial whilst each rotatable member rotates about the axis of the ring.

8. Automatic device as claimed in claim 6, wherein the number of discharge valves and electromagnetic means is reduced to two.

9. Automatic device for mixing liquids in variable amounts, comprising in combination a plurality of discharge valves, set in discharge position by rotating through a given angle, means supplying them respectively with the liquids to be blended; a mixing tank located under said valves when in open position, the outlet members of said valves are moved into a position over the said tank to discharge thereinto when the valves are opened, and are moved out of such discharge position over the mixing tank as the valves are closed, said outlet members being then moved into a position over two receptacles connected to the source of liquids, wherein any drop of liquid that still might flow out from the closed valves will be recovered and fed back to the source of liquid, the said two receptacles being oppositely arranged adjacent to the said mixing tank; electromagnets having coils and movable plungers, means associated with the plungers and adapted to rotate said valves into their discharge positions for a determined path of travel of the plungers, spring means biasing the plungers away from the coils, a control mechanism, connections connecting the coils of the electromagnets with the control mechanism, a source of electrical energy, connections connecting the source with the control mechanism and the said coils to energize these coils in a given sequence for each one of its operative cycles, other means enabling these energizing durations to be varied at any time, so that one of them can be varied from zero to one half the cycle period whereas the other one is varying from one half to full cycle period, said connections between the coils and the control mechanism being changeable enabling the cycle period of the said enabling means to be inverted.

10. Automatic device for mixing two liquids in variable amounts, comprising in combination two discharge valves set in open condition by rotation through a given angle, means respectively supplying them with the liquids to be blended; a mixing tank located under said valves when in open condition; the outlet members of said valves are moved into a position over the said tank to discharge thereinto when the valves are opened, and are moved out of such discharge position over the mixing tank as the valves are closed, said outlet members being then moved into a position over two receptacles connected to the source of liquid, wherein any drop of liquid that still might flow out from the closed valves will be recovered and fed back to the source of liquid, the said two receptacles being oppositely arranged adjacent to the said mixing tank; two electromagnets having coils and plungers adapted to rotate said valves through the said angle in opposite directions, a control mechanism comprising two superposed coaxial rings, the internal common circular face of which is provided with a circular coaxial recess, a rotatable member located within the rings, a lever pivotally mounted on said member and permanently pushed against the ring internal face, two contact pieces fixed to the rotatable member and forming with the lever a two-way switch, the switching action of which takes place at each passage of the lever over each surface connecting the recess with the circular face, connections respectively connecting the input terminals of the coils of the electromagnets to the two fixed contact pieces, a source of electric energy, connections connecting said source to the output terminals of the coils and to the pivotable lever, means cooperating with one of the two rings to adjust at any time the angular width of the recess within the limits zero–180 degrees.

11. In a device as claimed in claim 10, wherein the internal circular faces of the superposed rings have the same diameter and are respectively provided with two circular recesses coaxial with the faces and having an angular width of 180 degrees, one of those rings being fixed and the other one rotatable, the rotatable ring being engaged by the adjusting means to rotate it through 180 degrees.

ALFRED BLONDEL.

References Cited in the file of this patent
UNITED STATES PATENTS

| Number | Name | Date |
|---|---|---|
| 286,070 | Richards | Oct. 2, 1883 |
| 300,170 | Van Riper et al. | June 10, 1884 |
| 1,372,326 | Wood | Mar. 22, 1921 |
| 1,704,982 | Lindsay | Mar. 12, 1929 |
| 1,808,231 | Jeavons | June 2, 1931 |
| 2,210,719 | Hodges | Aug. 6, 1940 |
| 2,254,795 | Daniels | Sept. 2, 1941 |
| 2,313,846 | Tamminga | Mar. 16, 1943 |